(12) United States Patent
Konoura et al.

(10) Patent No.: US 10,901,699 B2
(45) Date of Patent: Jan. 26, 2021

(54) DATA ANALYSIS PROCESS ASSISTANCE DEVICE AND DATA ANALYSIS PROCESS ASSISTANCE METHOD

(71) Applicant: Hitachi, Ltd., Tokyo (JP)

(72) Inventors: Hiroaki Konoura, Tokyo (JP); Ken Sugimoto, Tokyo (JP); Yu Nakata, Tokyo (JP); Masafumi Kinoshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/494,471

(22) PCT Filed: Aug. 23, 2018

(86) PCT No.: PCT/JP2018/031100
§ 371 (c)(1),
(2) Date: Sep. 16, 2019

(87) PCT Pub. No.: WO2019/039534
PCT Pub. Date: Feb. 28, 2019

(65) Prior Publication Data
US 2020/0019383 A1 Jan. 16, 2020

(30) Foreign Application Priority Data

Aug. 23, 2017 (JP) ................. 2017-160056

(51) Int. Cl.
*G06F 8/30* (2018.01)
*G06F 16/26* (2019.01)
(Continued)

(52) U.S. Cl.
CPC ............ *G06F 8/30* (2013.01); *G06F 9/44526* (2013.01); *G06F 16/26* (2019.01); *G06F 3/0481* (2013.01); *G06F 3/04842* (2013.01); *G06F 8/60* (2013.01)

(58) Field of Classification Search
CPC ........ G06F 8/30; G06F 16/26; G06F 9/44526; G06F 3/0481; G06F 3/04842; G06F 8/60
See application file for complete search history.

(56) References Cited

U.S. PATENT DOCUMENTS 9,880,814 B1 * 1/2018 Fisher .................. H04L 69/18
10,572,576 B1 * 2/2020 Marc-Aurele ........ G06F 40/117
(Continued)

FOREIGN PATENT DOCUMENTS

| JP | 2000-285128 A | 10/2000 |
|----|---|---|
| JP | 2005-275913 A | 10/2005 |
| WO | WO 2014/010071 A1 | 1/2014 |

OTHER PUBLICATIONS

International Search Report (PCT/ISA/210) issued in PCT Application No. PCT/JP2018/031100 dated Nov. 6, 2018 with English translation (two (2) pages).
Japanese-language Written Opinion (PCT/ISA/237) issued in PCT Application No. PCT/JP2018/031100 dated Nov. 6, 2018 (three (3) pages).

*Primary Examiner* — Phillip H Nguyen
(74) *Attorney, Agent, or Firm* — Crowell & Moring LLP

(57) ABSTRACT

The design and development of a data analysis process is assisted and the burden on the user such as a data analyst in data analysis process is reduced. For a data analysis performed by executing each of a data access process, a data analysis process, and an analysis result visualization process, a data analysis process assistance device stores analysis process setting information including setting information for variables commonly used between the respective processes, and plugins corresponding to the respective processes, each of the plugins including basic information that is information on contents of the respective processes, a program code used as a base to generate a template for a program for achieving each of the processes, the variables of the analysis process setting information, and a description related to a variable cross-referenced between the respective processes;

(Continued)

and generates the template while ensuring a relationship or consistency between the analysis process setting information and the plugins corresponding to the respective processes.

18 Claims, 14 Drawing Sheets

(51) Int. Cl.
  *G06F 9/445* (2018.01)
  *G06F 3/0481* (2013.01)
  *G06F 3/0484* (2013.01)
  *G06F 8/60* (2018.01)

(56) References Cited

U.S. PATENT DOCUMENTS

| | | | |
|---|---|---|---|
| 2003/0110312 A1* | 6/2003 | Gunduc | G06F 9/44526 719/328 |
| 2008/0162531 A1* | 7/2008 | van Eikeren | G06F 9/465 |
| 2013/0103677 A1* | 4/2013 | Chakra | G06F 16/248 707/723 |
| 2014/0040058 A1* | 2/2014 | Aklian | G06F 16/93 705/26.1 |
| 2016/0357526 A1* | 12/2016 | Soffer | G06F 8/38 |
| 2017/0337220 A1* | 11/2017 | Metz | G06K 9/00456 |

\* cited by examiner

ANALYSIS PROCESS SETTING INFORMATION

512

```
1   ###### ANALYSIS FLOW SETTINGS ######
2
3                        601
4   ### COMMON SETTINGS
5   ## FOR DEPLOYMENT
6   # CONTAINER ADDRESS
7   set analyze_addr "192.168.0.1:8282"
8   set visualize_addr "192.168.0.2:8282"
9   set db_addr "192.168.0.3:8282"
10  set plugin_run_order "{db_plugin[0], analysis_plugin, visual_plugin, db_plugin[1]}"
11  :
12                      602
13  ### DB ACCESS SETTINGS
14  set db_plugin_name "{"db_typeA_get_CSV", "db_typeA_put_CSV"}"
15  set db_table_get_name "sample_table_get"
16  set db_table_put_name "sample_table_put"
17  :
18                    603
19  ### ANALYSIS SETTINGS
20  set analysis_plugin_name "analysis_typeA"
21  set input_file_name "/tmp/input.csv"
22  set output_file_name "/tmp/output.csv"
23  set output_header "{"x-axis", "y-axis", "z-axis"}"
24  :
25                       604
26  ### VISUALIZATION SETTINGS
27  set visual_plugin_name "vis_3D_bar_chart"
28  :
29
30
```

FIG. 6

ANALYSIS PLUGIN

```
1   %analysis_plugin_name "analysis_typeA"
2   # Info
3   %info Format_type "CSV_UTF-8"
4   %info Inputs  "{(x_axis, int, N), (y_axis, int, N), (t_edge, double, N), (b_edge,
5   double, N), (height, double, N)}"
6   %info Outputs "{(x_axis, int, N), (y_axis, int, N), (z_axis, double, N)}"
7   %info Language "script_tool"
8   %info Library "script_tool v1.0"
9   %info Required_variable "input_file_name (String), output_file_name
10  (String), output_header (String)"
11  :
12  # Rules
13  
14  # Options
15  
16  # Template codes / filename
17  %tmpl_codes_begin
18  text = ""
19  FILE.open(${input_file_name}, "r") do |fp|
20    while word = fp.gets
21      array = word.split(",")
22      z_val = ((array[2] + array[3]) * array[4]) / 2
23      text += "#{array[0]}, #{array[1]}, #{z_val}"
24    end
25  end
26  FILE.open("${output_file_name}", "w") do |fp|
27    fp.puts "${output_header}"
28    fp.puts text
29  end
30  %tmpl_codes_end
31  
32  # Template settings / filename
33  %tmpl_settings_begin
34  :
35  %tmpl_settings_end
```

FIG. 7

VISUALIZATION PLUGIN

```
1   %visual_plugin_name "vis_3D_bar"
2   # Info
3   %info Format_type "CSV_UTF-8"
4   %info Inputs "[(x_axis, int, N), (y_axis, int, N), (z_axis, double, N)]"
5   # %info Outputs
6   # %info Language
7   %info Library "vis_tool v2.0"
8   # %info Required_variable
9   :
10  # Rules
11  %rule Inputs_consistency_with_analysis_plugin_outputs
12  %rule set db_put_type "db_typeA_put_CSV"
13
14  # Options
15
16  # Template codes / filename
17  %tmpl_code_file "/tmp/3D_bar_chart_sample_work"
18
19  # Template settings / filename
20  %tmpl_setting_file "/tmp/3D_bar_chart_sample_settings"
21
22
23
24
```

FIG. 8

DATA ACCESS PLUGIN

```
1   %db_plugin_name "db_typeA_get_CSV"
2   # Info
3   %info Format_type "CSV_UTF-8"
4   # %info Inputs
5   # %info Outputs
6   %info Language "RDB_SQL"
7   %info Library "DB v1"
8   %info Required variable: db_table_get_name (String)
9   :
10  # Rules
11  # Options
12  %option Inputs_refer_analysis_plugin_inputs
13  # Template codes / filename
14  %tmpl_codes_begin
15  SELECT %ANALYSIS_PLUGIN_INPUTS% FROM
16  ${db_name}.${db_table_get_name}
17  :
18  %tmpl_codes_end
19  # Template settings / filename
20  %tmpl_settings set db_name DB
21  :
```

FIG. 9

DATA ANALYSIS PROCESS ASSISTANCE DEVICE AND DATA ANALYSIS PROCESS ASSISTANCE METHOD

INCORPORATION BY REFERENCE

This application claims priority to Japanese Patent Application No. 2017-160056 filed on Aug. 23, 2017, the entire disclosure of which is incorporated herein by reference.

TECHNICAL FIELD

The present invention relates to a data analysis process assistance device and a data analysis process assistance method.

BACKGROUND ART

Patent Literature 1 describes "An information processing system includes: a plurality of databases each storing pieces of data corresponding to different data items; an input/output unit for inputting/outputting data; a connection module generation unit that generates one or more connection modules connectable to the respective databases in which pieces of data corresponding to one or more data items input through the input/output unit are stored, and outputs the generated modules to the input/output unit; and a program generation unit that is connected to the databases using the respective connection modules generated by the connection module generation unit, generates a data acquisition program for causing a computer to implement an information extraction processing function for extracting desired information corresponding to the data items from information acquired by the respective connection modules, and outputs the generated program to the input/output unit." and "The data user can freely acquire the desired data from the distributed database, and the data user can perform desired processing on the acquired data and the data user can freely use the desired data even if the data user does not have advanced skills of data processing."

Patent Literature 2 describes "task analysis in various tasks is efficiently performed." and "A task analysis system that analyzes various tasks in a core system that performs various tasks includes: a DB template for extracting various data of the core system and having a database in which the extracted data is stored; a task analysis template for instructing the DB template to collect data necessary for analysis of various tasks, displaying an analysis menu for various tasks, and outputting an analysis instruction for an analysis specified through an operation; and an OLAP template for retrieving data necessary for an analysis instructed from the DB template based on the analysis instruction input from the task analysis template, and executing the instructed analysis using the retrieved data, the task analysis template having an analysis result output unit that outputs an analysis result of the executed analysis."

CITATION LIST

Patent Literature

[Patent Literature 1] JP-A-2005-275913
[Patent Literature 2] JP-A-2000-285128

SUMMARY OF INVENTION

Technical Problem

Efforts are being made in various fields to create values, such as cost reduction and new service planning, by analyzing a huge amount of data such as IoT data and big data. Data analysts involved in these tasks are required to have knowledge about engineering such as data acquisition and processing in addition to knowledge about science and business.

In general, processes necessary for data analysis (hereinafter referred to as data analysis process) include a process related to access to data such as a file system, data lake, and data warehouse (DWH) (hereinafter referred to as a data access process), a process of analyzing data to be analyzed (hereinafter referred to as a data analysis process), and a process of visualizing an analysis result output by the data analysis process (hereinafter referred to as an analysis result visualization process). In order to design and develop data analysis processes by combining software (OSS (Open Source Software), commercial software, etc.) and services used to implement these processes, it is necessary for data analysts to proceed with work with understanding various software and services, which causes the data analysts to consume a great deal of efforts and time to ensure consistency between software and services.

Patent Literatures 1 and 2 listed above are both related to more efficient data analysis, but fail to disclose any mechanism for reducing the burden on data analysts while ensuring mutual relationships and consistency between the data access process, the data analysis process, and the analysis result visualization process, which are the processes constituting the data analysis process.

The present invention has been made in view of such a background, and an object of the invention is to provide a data analysis process assistance device and a data analysis process assistance method capable of assisting the design and development of data analysis process to proceed the data analysis process efficiently.

Solution to Problem

One aspect of the present invention is a data analysis process assistance device for assisting a data analysis performed by executing each of a data access process, a data analysis process, and an analysis result visualization process. The data analysis process assistance device includes a processor and a storage device, and includes a storage unit configured to store analysis process setting information including setting information for variables commonly used between the respective processes, and plugins corresponding to the respective processes, each of the plugins including basic information that is information on contents of the respective processes, a program code used as a base to generate a template for a program for achieving each of the processes, the variables of the analysis process setting information, and a description related to a variable cross-referenced between the respective processes; and an execution information generation unit configured to generate the template while ensuring a relationship or consistency between the analysis process setting information and the plugins corresponding to the respective processes.

Other objects and solutions disclosed in the present application will be apparent from the following Description of Embodiment(s) and from the accompanying drawings.

Advantageous Effects of Invention

According to the present invention, a user such as a data analyst can proceed a data analysis process efficiently.

BRIEF DESCRIPTION OF DRAWINGS

FIG. 6 is an example of analysis process setting information.

FIG. 7 is an example of an analysis plugin.

FIG. 8 is an example of a visualization plugin.

FIG. 9 is an example of a data access plugin.

DESCRIPTION OF EMBODIMENT(S)

Figure 1:
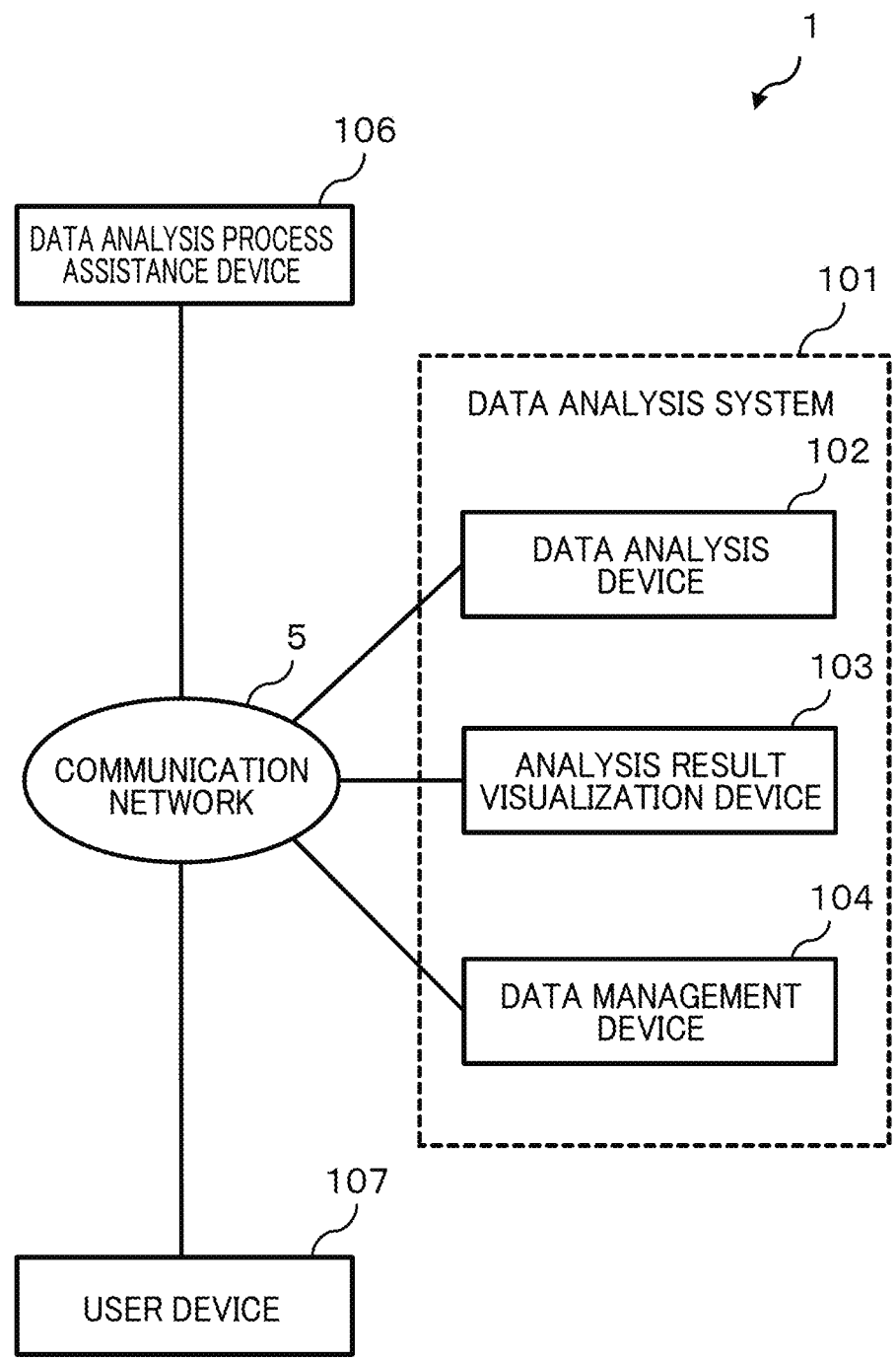
FIG. 1 is a diagram illustrating a schematic configuration of an information processing system.

Hereinafter, embodiments will be described with reference to the drawings. In the following description, the same reference numerals may be used to designate the same or similar components so that no duplicate explanation is made herein. A database may be referred to as "DB". A program may be referred to as "PG". In the following description, the term "set" as used means a collection of the same type of information.

FIG. 1 illustrates a schematic configuration of an information processing system 1 provided as an embodiment. As illustrated in FIG. 1, the information processing system 1 includes a system (hereinafter referred to as data analysis system 101) that analyzes data (hereinafter referred to as analysis target data) such as IoT data and big data, a data analysis process assistance device 106 that assists the design and development of a process for data analysis (hereinafter referred to as data analysis process) using the data analysis system 101, and a user device 107 that is a device operated by the user. The data analysis system 101 includes a data analysis device 102, an analysis result visualization device 103, and a data management device 104. The data analysis device 102, the analysis result visualization device 103, the data management device 104, the data analysis process assistance device 106, and the user device 107 are all information processing devices (computers).

The data analysis device 102, the analysis result visualization device 103, the data management device 104, the data analysis process assistance device 106, and the user device 107 are communicably connected to each other via a communication network 5. The communication network 5 is, for example, a wired or wireless LAN (Local Area Network), a WAN (Wide Area Network), the Internet, an intranet, a dedicated line, or the like.

The data analysis process assistance device 106 assists the design and development of programs and setting information stored in the data analysis device 102, the analysis result visualization device 103, and the data management device 104.

The data analysis device 102 receives an input of analysis target data acquired from the data management device 104 and executes the data analysis process with respect to the analysis target data, and transmits the data generated as a result (hereinafter referred to as analysis result data) to the data management device 104 and the analysis result visualization device 103. The analysis target data includes, for example, data acquired from the Internet by techniques such as Web scraping, data acquired from SNS (Social Networking Service), IoT data collected from sensors, POS (point of sale) data, machine learning data, questionnaire data, big data, and the like.

The analysis result visualization device 103 visualizes the analysis result data generated by the data analysis process (for example, visualizes it in the form of a graph, a table, a Web page, etc.) as provided to the user (hereinafter referred to as analysis result visualization process).

The data management device 104 manages the analysis target data and the analysis result data (for example, registration, update, and deletion in a database). The data management device 104 performs a process related to access (input/output) to the analysis target data and the analysis result data (hereinafter referred to as data access process). Further, the data management device 104 performs a preprocess (data processing, data extraction, etc.) when the analysis target data is generated. The analysis target data is fetched into the data management device 104 via the communication network 5, for example. Further, the analysis target data is fetched into the data management device 104 by reading from a recording medium (optical recording medium, semiconductor memory, externally connected HDD, etc.), for example. The fetch of the analysis target data is performed using, for example, an ETL tool (ETL: Extract Transform Load).

The data analysis process assistance device 106 generates a template for a program (hereinafter referred to as a PG template) to be executed in the corresponding one of the data analysis device 102, the analysis result visualization device 103, and the data management device 104, various setting information for each device, and a program library for each device (hereinafter referred to as library), and deploys the generated PG template, various setting information, and library on the corresponding distribution destination (data analysis device 102, analysis result visualization device 103, or data management device 104).

The user device 107 is a device operated by the user, such as a data analyst, an administrator of the information processing system 1, or an operator, in the use or operation of the data analysis process assistance device 106 or the data analysis system 101.

The data analysis device 102, the analysis result visualization device 103, the data management device 104, the data analysis process assistance device 106, and the user device 107 may all or partly be information processing devices configured with physical hardware. For example, all or part of them may be virtually implemented like a virtual machine provided by a cloud system. Further, these devices may be configured using a plurality of information processing devices, or all or some of these devices may be provided as a common information processing device. Further, respective functions of these devices may be implemented by distributing them to a plurality of information processing devices in units of functions.

Figure 2:
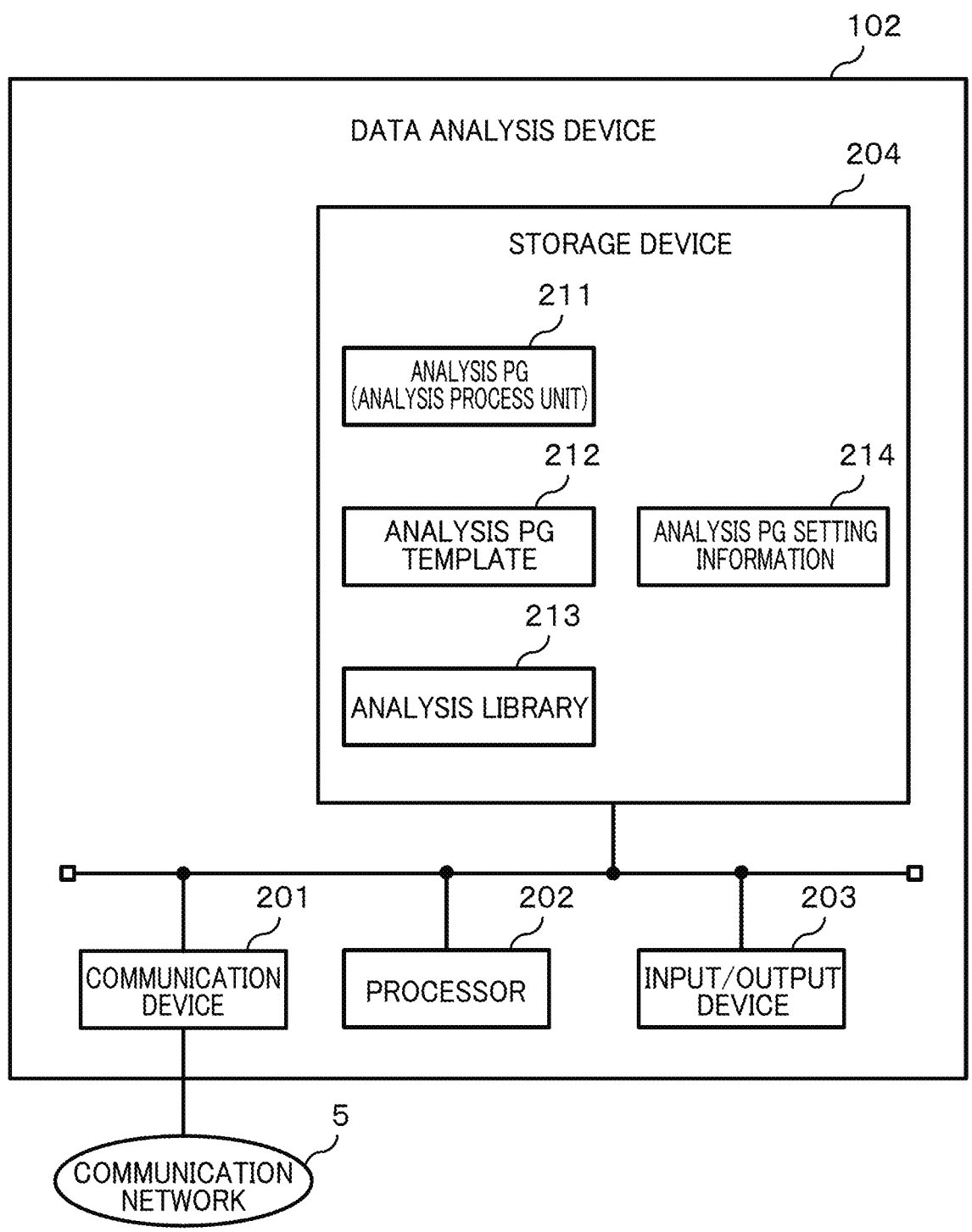
FIG. 2 is a diagram illustrating a main configuration of a data analysis device.

FIG. 2 is a diagram illustrating a main configuration of the data analysis device 102. As illustrated in FIG. 2, the data analysis device 102 includes a communication device 201, a processor 202, an input/output device 203, and a storage device 204. These are communicably connected to each other via an internal communication line (for example, a bus).

The communication device 201 is an interface that achieves communication with other devices via the communication network 5, and is configured using, for example, a NIC (Network Interface Card) or a wireless communication module.

The processor 202 is configured using a CPU (Central Processing Unit), an MPU (Micro Processing Unit), or the like. The processor 202 executes the programs stored in the storage device 204 to implement various functions of the data analysis device 102.

The input/output device 203 receives an input of information and outputs information. The input/output device 203 receives an input of information from a keyboard, a mouse, or the like. Further, the input/output device 203 displays the information transmitted from the processor 202 on a display device such as a liquid crystal display.

The storage device 204 includes a volatile storage device (DRAM (Dynamic Access Random Memory) or the like) or a non-volatile storage device (HDD (Hard Disk Drive), SSD (Solid State Drive), NVRAM (Non-volatile memory) or the like). The storage device 204 stores therein an analysis PG 211, an analysis PG template 212, an analysis library 213, and analysis PG setting information 214.

The analysis PG 211 is a program for achieving the data analysis process. Hereinafter, a function implemented by the analysis PG 211 executed is referred to as an analysis process unit. The analysis PG 211 enables to be edited using the analysis PG template 212 as a base by the user such as a data analyst via the input/output device 203.

The analysis process unit receives an input of the analysis target data provided from the data management device 104 to perform the data analysis process on the analysis target data. The analysis process unit transmits the analysis result data generated by the data analysis process to the analysis result visualization device 103 and the data management device 104.

The analysis PG template 212 includes a program serving as a template for the analysis PG 211. The analysis PG template 212 is generated by an execution information generation unit, which is described later, of the data analysis process assistance device 106.

The analysis library 213 includes one or more libraries (programs) used when the analysis PG 211 is executed.

The analysis PG setting information 214 is various setting information referred to by the analysis PG template 212. When the user such as a data analyst creates the analysis PG 211 using the analysis PG template 212 as a base, the user changes the analysis PG setting information 214 and adds a setting item, as necessary.

Figure 3:
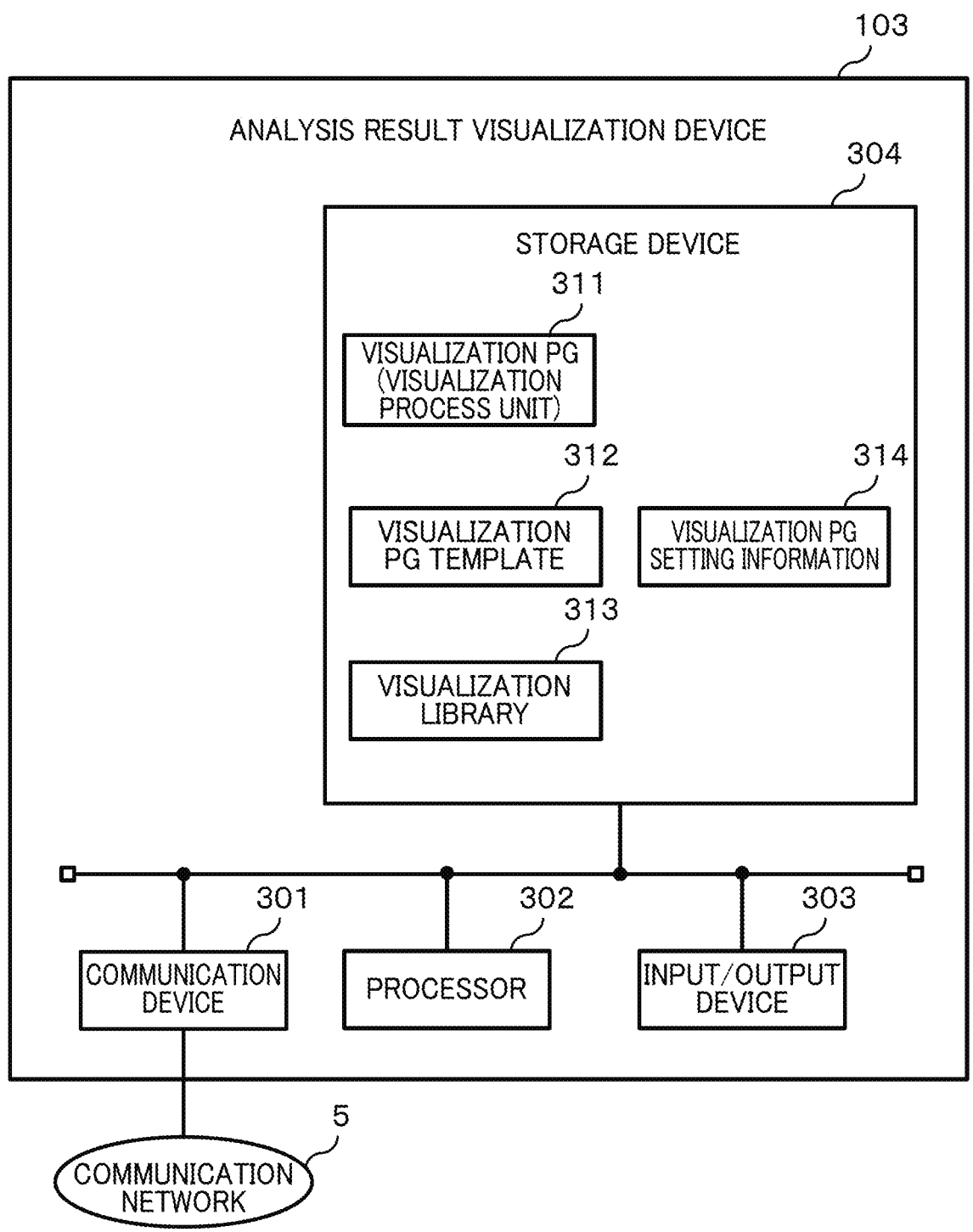
FIG. 3 is a diagram illustrating a main configuration of an analysis result visualization device.

FIG. 3 is a diagram illustrating a main configuration of the analysis result visualization device 103. As illustrated in FIG. 3, the analysis result visualization device 103 includes a communication device 301, a processor 302, an input/output device 303, and a storage device 304. These are communicably connected to each other via an internal communication line (for example, a bus).

The communication device 301 is an interface that achieves communication with other devices via the communication network 5, and is configured using, for example, a NIC or a wireless communication module.

The processor 302 is configured using a CPU, an MPU, or the like. The processor 302 executes the programs stored in the storage device 304 to implement various functions of the analysis result visualization device 103.

The input/output device 303 receives an input of information and outputs information. The input/output device 303 receives an input of information from a keyboard, a mouse, or the like. Further, the input/output device 303 displays the information transmitted from the processor 302 on a display device such as a liquid crystal display.

The storage device 304 includes a volatile storage device (DRAM, etc.) or a non-volatile storage device (HDD, SSD, NVRAM, etc.). The storage device 304 stores therein a visualization PG 311, a visualization PG template 312, a visualization library 313, and visualization PG setting information 314.

The visualization PG 311 is a program for achieving the analysis result visualization process. Hereinafter, a function implemented by the visualization PG 311 executed is referred to as a visualization process unit. The visualization PG 311 enables to be edited using the visualization PG template 312 as a base by the user such as a data analyst via the input/output device 303. The visualization PG 311 may be provided through a BI tool (BI: Business Intelligence Tool), commercial software, OSS (Open-Source Software), a commercial service, or the like.

The visualization process unit receives an input of the analysis result data provided from the data management device 104 to perform the analysis result visualization process on the analysis result data.

The visualization PG template 312 includes a program serving as a template for the visualization PG 311. The visualization PG template 312 is generated by the execution information generation unit, which is described later, of the data analysis process assistance device 106.

The visualization library 313 includes one or more libraries (programs) used when the visualization PG 311 is executed.

The visualization PG setting information 314 is various setting information referred to by the visualization PG template 312. When the user such as a data analyst creates the visualization PG 311 using the visualization PG template 312 as a base, the user changes the visualization PG setting information 314 and adds a setting item, as necessary.

Figure 4:
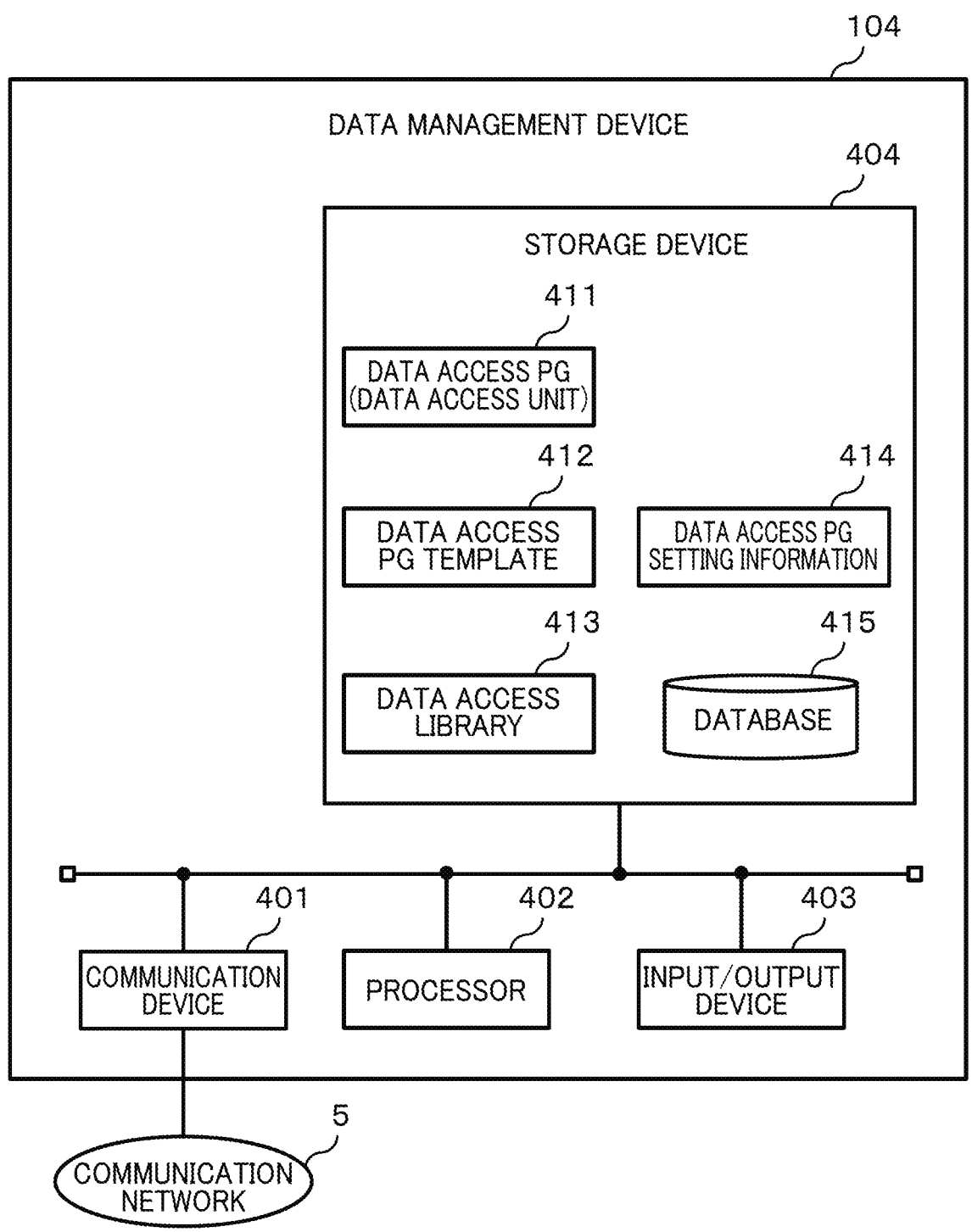
FIG. 4 is a diagram illustrating a main configuration of a data management device.

FIG. 4 is a diagram illustrating a main configuration of the data management device 104. As illustrated in FIG. 4, the data management device 104 includes a communication device 401, a processor 402, an input/output device 403, and a storage device 404. These are communicably connected to each other via an internal communication line (for example, a bus).

The communication device 401 is an interface that achieves communication with other devices via the communication network 5, and is configured using, for example, a NIC or a wireless communication module.

The processor 402 is configured using a CPU, an MPU, or the like. The processor 402 executes the programs stored in the storage device 404 to implement various functions of the data management device 104.

The input/output device 403 receives an input of information and outputs information. The input/output device 403 receives an input of information from a keyboard, a mouse, or the like. Further, the input/output device 403 displays the information transmitted from the processor 402 on a display device such as a liquid crystal display.

The storage device 404 includes a volatile storage device (DRAM, etc.) or a non-volatile storage device (HDD, SSD, NVRAM, etc.). The storage device 404 stores therein a data access PG 411, a data access PG template 412, a data access library 413, and data access PG setting information 414.

The storage device 404 stores therein information for a database 415 managed by a DBMS (Data Base Management System) functioning in the data management device 104. The database 415 stores therein analysis target data, various types of intermediate data generated by the data analysis process, and analysis result data. Note that, in the present embodiment, the analysis target data, the intermediate data, and the analysis result data are managed using the database 415 as described above, but the method of managing such data is not necessarily limited. For example, such data may be managed by a file system.

The data access PG 411 is a program for achieving the data access process. Hereinafter, a function implemented by the data access PG 411 is referred to as a data access unit. The data access PG 411 enables to be edited using the data access PG template 412 as a base by a user such as a data analyst via the input/output device 403. When the database 415 is a relational database (RDB), the data access PG 411 is defined using, for example, SQL (Structured Query Language) statements. The data access unit, for example, acquires, stores, and deletes data with respect to the database 415.

The data access PG template 412 includes a program serving as a template for the data access PG 411. The data access PG template 412 is generated by the execution information generation unit, which is described later, of the data analysis process assistance device 106.

The data access library 413 includes one or more libraries (programs) used when the data access PG 411 is executed.

The data access PG setting information 414 is various types of setting information referred to by the data access PG template 412. When the user such as a data analyst creates the data access PG 411 using the data access PG template 412 as a base, the user changes the data access PG setting information 414 and adds a setting item, as necessary.

Figure 5:
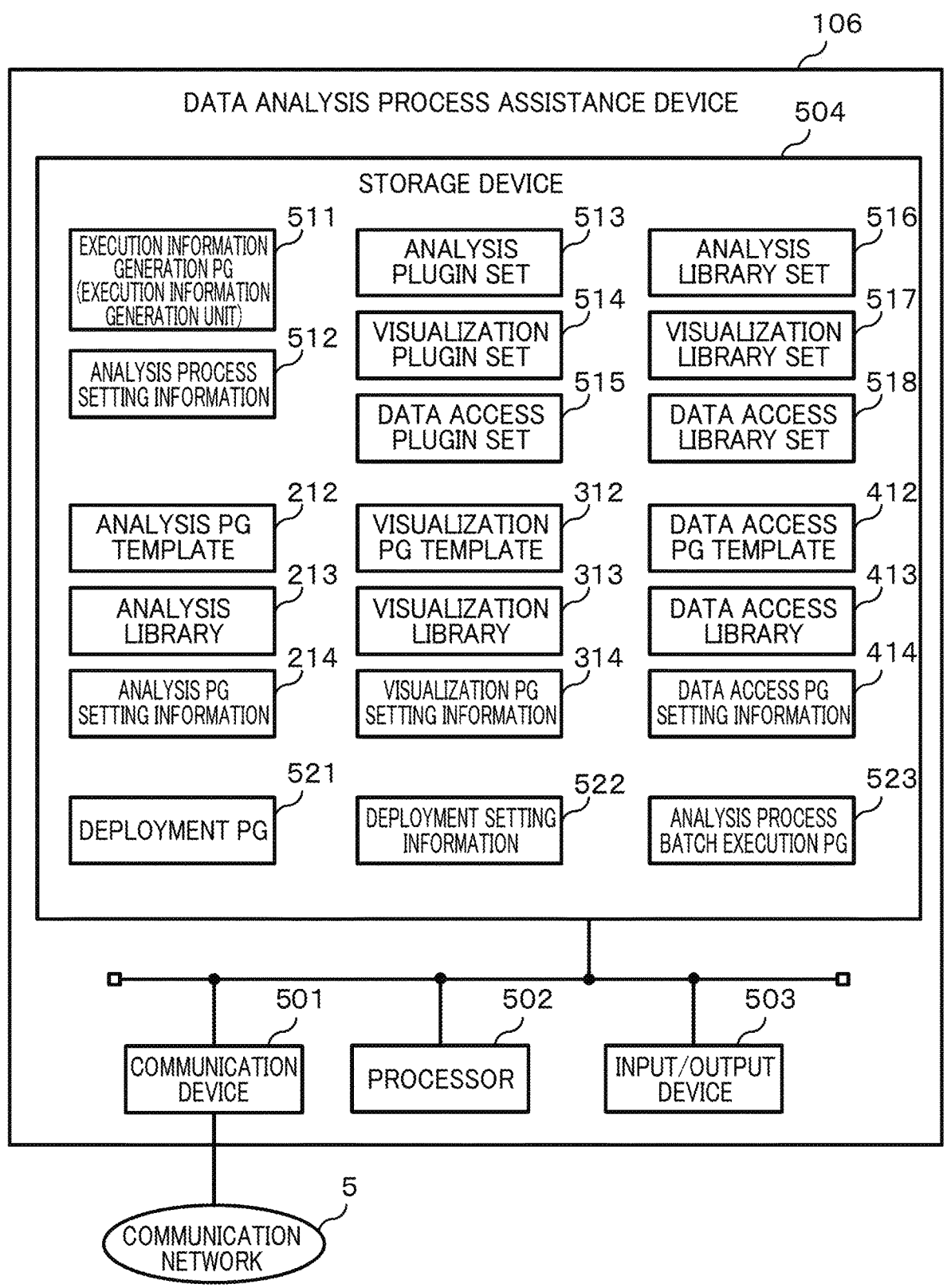
FIG. 5 is a diagram illustrating a main configuration of a data analysis process assistance device.

FIG. 5 is a diagram illustrating a main configuration of the data analysis process assistance device 106. As illustrated in FIG. 5, the data analysis process assistance device 106 includes a communication device 501, a processor 502, an input/output device 503, and a storage device 504. These are communicably connected to each other via an internal communication line (for example, a bus).

The communication device 501 is an interface that achieves communication with other devices via the communication network 5, and is configured using, for example, a NIC or a wireless communication module.

The processor 502 is configured using a CPU, an MPU, or the like. The processor 502 executes the programs stored in the storage device 504 to implement various functions of the data analysis process assistance device 106.

The input/output device 503 receives an input of information and outputs information. The input/output device 503 receives an input of information from a keyboard, a mouse, or the like. Further, the input/output device 503 displays the information transmitted from the processor 502 on a display device such as a liquid crystal display.

The storage device 504 includes a volatile storage device (DRAM, etc.) or a non-volatile storage device (HDD, SSD, NVRAM, etc.).

The storage device 504 stores therein an execution information generation PG 511, which is a program for achieving a process (hereinafter referred to as execution information generation process) of generating execution information (the analysis PG template 212, the analysis library 213, the analysis PG setting information 214, the visualization PG template 312, the visualization library 313, the visualization PG setting information 314, the data access PG template 412, the data access library 413, the data access PG setting information 414, a deployment PG 521, deployment setting information 522, and an analysis process batch execution PG 523), which is information for achieving the data analysis process. Hereinafter, a function implemented by the execution information generation PG 511 is referred to as an execution information generation unit. The execution information generation PG 511 performs the execution information generation process in an interactive manner with the user such as a data analyst via, for example, a GUI (Graphical User Interface) or a CUI (Character User Interface).

Further, the storage device 504 stores therein input information (analysis process setting information 512, analysis plugin set 513, visualization plugin set 514, data access plugin set 515, analysis library set 516, visualization library set 517, and data access library set 518) of the execution information generation process.

Further, the storage device 504 stores therein output information (the analysis PG template 212, the analysis library 213, the analysis PG setting information 214, the visualization PG template 312, the visualization library 313, the visualization PG setting information 314, the data access PG template 412, the data access library 413, the data access PG setting information 414, the deployment PG 521, the deployment setting information 522, and the analysis process batch execution PG 523) of the execution information generation process.

The execution information generation unit determines based on the analysis process setting information 512 whether or not a plugin specified by the analysis process setting information 512 is included in the corresponding plugin set (the analysis plugin set 513, the visualization plugin set 514, or the data access plugin set 515). Note that, in the following description, plugins included in the analysis plugin set 513 are referred to as analysis plugins, plugins included in the visualization plugin set 514 as visualization plugins, and plugins included in the data access plugin sets 515 as data access plugins.

When the plugin specified in the analysis process setting information 512 is included in the corresponding plugin sets, the execution information generation unit generates, based on the contents of description in the specified plugin, a program template (the analysis PG template 212, the visualization PG template 312, or the data access PG template 412) and setting information (the analysis PG setting information 214, the visualization PG setting information 314, or the data access PG setting information 414). Further, the execution information generation unit extracts a library (the analysis library 213, the visualization library 313, or the data access library 413) referred to by the program template from the corresponding library set (the analysis library set 516, the visualization library set 517, or the data access library set 518).

The analysis process setting information 512 includes various types of setting information referred to when the data analysis process, the analysis result visualization process, and the data access process are each executed.

Each plugin set (the analysis plugin set 513, the visualization plugin set 514, the data access plugin set 515) is a set of the corresponding program template (the analysis PG template 212, the visualization PG template 312, or the data access PG template 412) and the corresponding setting information (the analysis PG setting information 214, the visualization PG setting information 314, or data access PG setting information 414).

In the plugin, described in a predetermined description format are the contents of additional variables necessary for generating the program template and setting information, a library necessary for executing the program template, dependencies between other plugins and libraries, and rules such as specification of input format, and the like. Noted that, since past contents are accumulated in the plugin by repeatedly performing the data analysis process, the burden on the user for designing and developing the data analysis process is reduced as the data analysis process is repeatedly performed.

Each library set (the analysis library set 516, the visualization library set 517, the data access library set 518) includes one or more libraries used when the corresponding program template (the analysis PG template 212, the visualization PG template 312, or the data access PG template 412) is executed. The execution information generation unit determines whether or not the library specified in the plugin is included in the corresponding library set. If it is included, the execution information generation unit extracts the corresponding program library (the analysis library 213, the visualization library 313, or the data access library 413).

The program templates (the analysis PG template 212, the visualization PG template 312, and the data access PG template 412) are templates for programs for achieving the data analysis process, the analysis result visualization process, and the data access process, respectively.

The program setting information (the analysis PG setting information 214, the visualization PG setting information 314, the data access PG setting information 414) includes various types of setting information referred to by the corresponding program template (the analysis PG template 212, the visualization PG template 312, or the data access PG template 412).

The deployment PG 521 includes a code (program) for deploying the execution information generated by the execution information generation PG 511 to each of the devices (the data analysis device 102, the analysis result visualization device 103, and the data management device 104).

The deployment setting information 522 includes information on the deployment PG 521 (for example, a relationship between a file and a server as the distribution destination, an IP address of the transmission destination, etc.). Note that the deployment setting information 522 is not necessarily essential, and for example, the contents of the deployment setting information 522 may be included in the deployment PG 521.

The analysis process batch execution PG 523, for example, calls the template programs for the data access process, the data analysis process, and the analysis result visualization process, which are each arranged in the corresponding device, in order, and then performs the data access process, the data analysis process, and the analysis result visualization process in order.

The user such as a data analyst edits the analysis process setting information 512 and the plugin sets (the analysis plugin set 513, the visualization plugin set 514, and the data access plugin set 515) as appropriate, executes the execution information generation PG 511, and deploys the generated information to the corresponding device (the data analysis device 102, the analysis result visualization device 103, or the data management device 104). Note that the user edits the analysis process setting information 512 and the plugin sets, for example, when designing the data analysis process for the first time or when changing the specification.

FIG. 6 is an example of the analysis process setting information 512. The analysis process setting information 512 includes a description 601 related to common settings such as environment construction, a description 602 related to setting for the data access process, a description 603 related to the data analysis process, and a description 604 related to the analysis result visualization process.

The description 601 related to common settings such as environment construction includes, for example, descriptions of the location (IP address, port number, etc.) of the devices, the order of executing the plugins, and the like, referred to when the deployment PG 521 and the deployment setting information 522 are generated.

The description 602 related to setting for the data access process includes, for example, descriptions related to an identifier (plugin name, etc.) of the data access plugin corresponding to the content of the data access process, specified variables required in the plugin, and the like. If "db_typeA_get_CSV" and "db_typeA_put_CSV" are specified as the data access plugin names in the description 602 as illustrated in FIG. 6, the execution information generation unit acquires, for example, the data access plugin illustrated in FIG. 9, whose plugin name is "db_typeA_get_CSV", and for example, the data access plugin illustrated in FIG. 10, whose plugin name is "db_typeA_put_CSV", in the data access plugin set 515.

The description 603 related to the data analysis process includes, for example, descriptions related to an identifier (plugin name, etc.) of the analysis plugin corresponding to the content of the data analysis process, specified variables used in the plugin, and the like.

The description 604 related to the analysis result visualization process includes, for example, descriptions related to an identifier (plugin name) of the visualization plugin corresponding to the content of the analysis result visualization process, specified variables used in the plugin, and the like.

Figure 10:
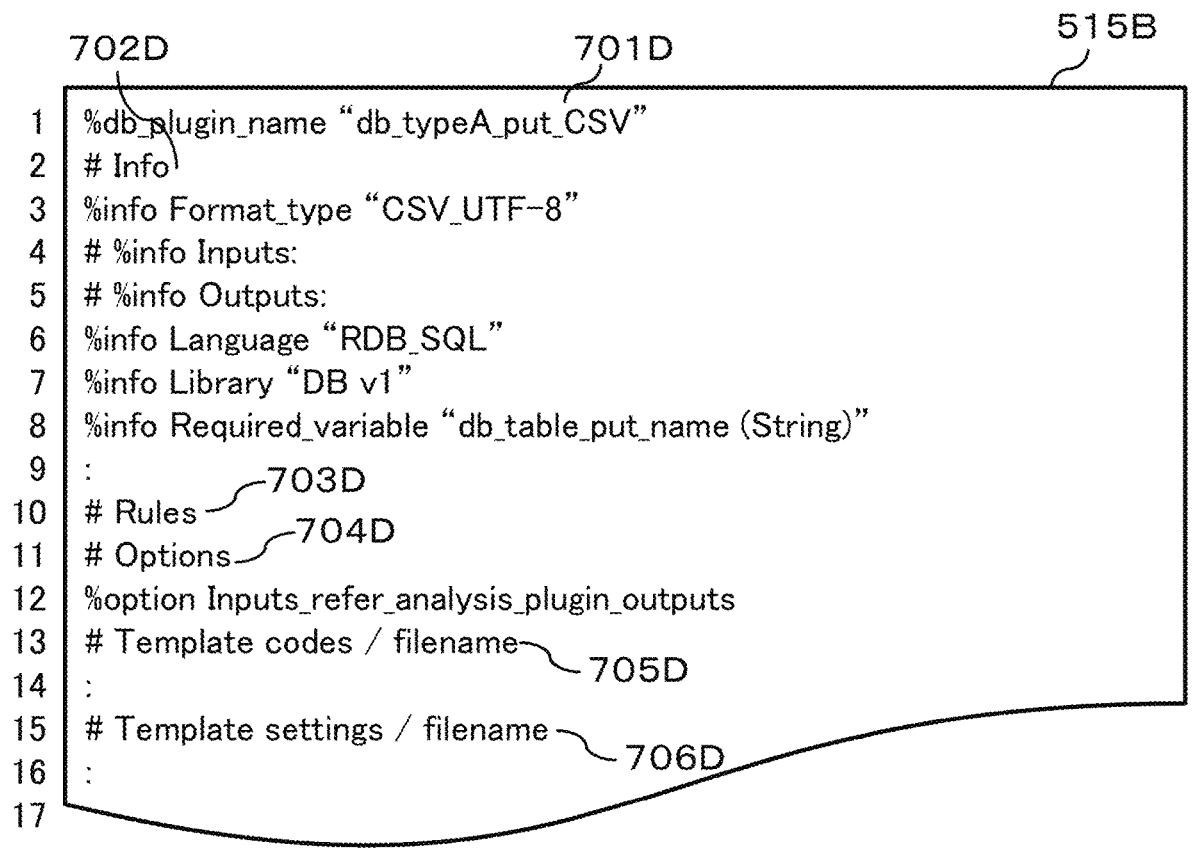
FIG. 10 is an example of a data access plugin.

FIG. 7 is an example of the analysis plugin of the analysis plugin set 513 (hereinafter referred to as analysis plugin 513A), and FIG. 8 is an example of the visualization plugin of the visualization plugin set 514 (hereinafter referred to as visualization plugin 514A), and FIGS. 9 and 10 are examples of the data access plugin of the data access plugin set 515 (hereinafter referred to as data access plugin 515A and data access plugin 515B, respectively).

As illustrated in FIGS. 7 to 10, the notation (description method) of each plugin is unified, and each plugin is described according to a common notation. For example, for any of the plugins, a character string beginning with "%" defines the individual description fields for description items (a plugin name 701, basic information 702, a rule 703, an option 704, a code 705 serving as a base for a template program, and a setting 706 serving as a base for a setting file). Further, for any of the plugins, "#" defines a comment line. Note that, in the following description, when it is necessary to distinguish between the plugins, the reference numeral for the corresponding description item is terminated with a character of "A" to "D".

In the analysis process setting information 512 illustrated in FIG. 6, "analysis_typeA" is described as the analysis plugin name in the description 603 related to the data analysis process. In this case, the execution information generation unit reads the analysis plugin 513A whose plugin name 701A is "analysis_typeA" in the analysis plugin set 513.

FIG. 7 is an example of the analysis plugin 513A in which the plugin name 701A "% analysis_plugin_name" is set to "analysis_typeA". As illustrated in FIG. 7, the plugin name 701 of the analysis plugin 513A describes information that is a key used to call the plugin based on the analysis process setting information 512.

In FIG. 7, the basic information 702 "# Info" describes information that is commonly set among the plugins. The basic information 702 describes, for example, the formats of the template program and setting information, the names, types, and numbers of samples of input arguments of the template program, the names, types, and number of samples of the output of the template program, the name of the library used by the template program, variables used in the template program and setting information, and the like. The basic information 702 is used in a consistency determination performed in view of whether or not the settings are within the support range of the execution information generation unit, whether or not the settings include settings necessary for the analysis process setting information 512, and the like. For example, if the data access plugin 515A describes that the character string variable "db_table_get_name" is necessary, the execution information generation unit determines whether or not "db_table_get_name" is described in the analysis process setting information 512; if it is not described, the execution information generation unit outputs error information indicating failure in variable.

The rule 703 "# Rules" describes a constraint condition to be satisfied when the execution information generation unit reads the plugin to generate a template program and setting information. For example, the constraint condition of "Inputs_consistency_with_analysis_plugin_outputs" described in a rule 703B of the visualization plugin 514A indicates the constraint that the visualization PG template 312 and the visualization PG setting information 314 are not generated if the number, types, and numbers of samples of arguments are inconsistent between the output of the analysis plugin and the input of the visualization plugin. Further, the rule 703 describes reserved words and determination items for each reserved word. Note that these descriptions may be separately prepared in the storage device 504 as plugins for the execution information generation unit. Further, functions and settings for processing a rule 703A may be described in the analysis process setting information 512, for example.

The option 704 "# Options" describes settings that may affect any process after the execution information generation unit reads the plugin. For example, an option 704C illustrated in FIG. 9 and an option 704D illustrated in FIG. 10 as the option 704 describe "Inputs_refer_analysis_plugin_inputs" and "Inputs_refer_analysis_plugin_outputs", respectively, which each defines that the input or output of the analysis plugin specified in the analysis process setting information 512 is treated as the input or output of the data access plugin. Note that functions and settings for processing the option 704 may be incorporated in the execution information generation unit, for example. Further, settings related to the option 704 may be described in the analysis process setting information 512.

The code 705 "# Template codes/filename" describes codes (program codes, etc.) serving as a base of templates (the analysis PG template 212, the visualization PG template 312, and the data access PG template 412) in a predetermined language. The codes described in the code 705 can refer to the variable setting given by the basic information 702 and the setting substituted by the description of the rule 703. For example, in the analysis plugin 513A of FIG. 7, the codes described in the code 705A can refer to the variables "input_file_name", "output_file_name", and "output_header" described in the basic information 702. Further, for example, in the data access plugin 515A of FIG. 9, the description "Inputs_refer_analysis_plugin_inputs" specified in the option 704 defines that "% ANALYSIS_PLUGIN_INPUTS %" is replaced with the variables "{(x_axis, int, N), (y_axis, int, N), (t edge, double, N), (b_edge, double, N), (height, double, N)}" based on the settings of the analysis plugin 513A of FIG. 7, so that these variables can be referred to by the codes described in the code 705A of the analysis plugin 513A of FIG. 7. Note that the code 705 may be directly described in the plugin in this way, or may refer to external data in which the code is described such as 705B of the visualization plugin 514A (in this example, a file path is specified to refer to an external file which describes the code).

The setting 706 "# Template settings/filename" describes settings unique to codes serving as a base of templates (the analysis PG template 212, the visualization PG template 312, and the data access PG template 412) described in the code 705. Note that, from the viewpoint of improving work efficiency, it is preferable that the common settings among a plurality of templates use variables in the basic information 702, the rule 703, and the option 704.

Figure 11:
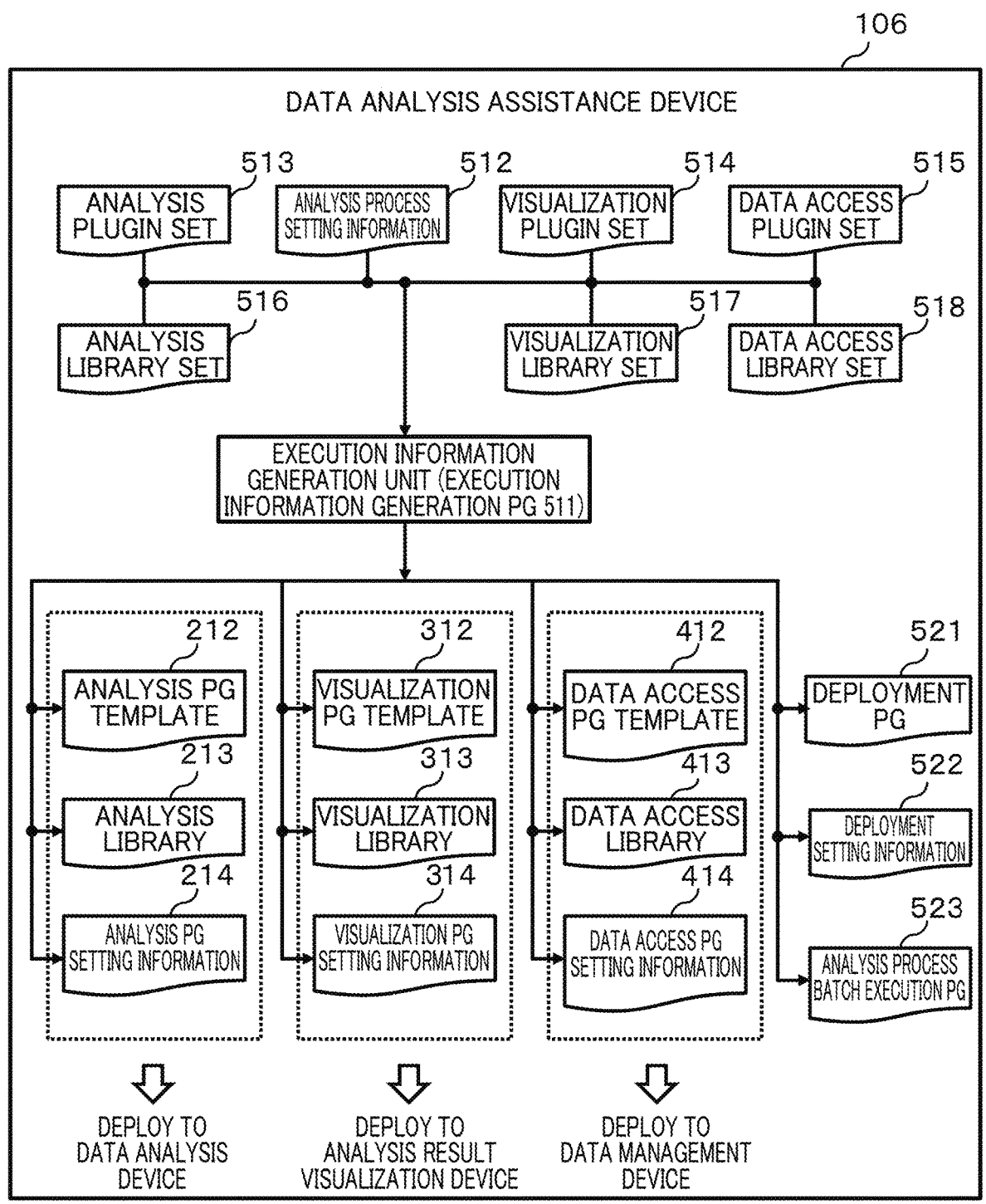
FIG. 11 is a data flow diagram illustrating an execution information generation process.

FIG. 11 is a data flow diagram illustrating a process performed by the execution information generation unit of the data analysis process assistance device 106 (hereinafter referred to as an execution information generation process S1100).

As illustrated in FIG. 11, the execution information generation unit receives inputs of the analysis plugin set 513, the visualization plugin set 514, the data access plugin set 515, the analysis library set 516, the visualization library set 517, and the data access library set 518 to execute the execution information generation process S1100.

The execution information generation processing S1100, when executed, generates the objects to be deployed (the analysis PG template 212, the analysis library 213, the analysis PG setting information 214, the visualization PG template 312, the visualization library 313, the visualization PG setting information 314, the data access PG template 412, the data access library 413, and the data access PG setting information 414) to the respective devices (the data analysis device 102, the analysis result visualization device 103, and the data management device 104) of the data analysis system 101, and also the deployment PG 521 and the deployment setting information 522, and the analysis process batch execution PG 523. Note that, in the present embodiment in this way, the deployment PG 521 and the deployment setting information 522 are generated by the execution information generation unit, but the deployment PG 521 and the deployment setting information 522 may be generated by other means instead of the execution information generation unit, for example, commercial software, OSS, or the like.

The deployment PG 521 is a program for achieving a process related to the deployment (hereinafter referred to as deployment process). The deployment process deploys the above-described objects to be deployed to the respective devices (the data analysis device 102, the analysis result visualization device 103, and the data management device 104) of the data analysis system 101 based on the deployment setting information 522. More specifically, the deployment process deploys the analysis PG template 212, the analysis library 213, and the analysis PG setting information 214 to the data analysis device 102, deploys the visualization PG template 312, the visualization library 313, and the visualization PG setting information 314 to the analysis result visualization device 103, and deploys the data access PG template 412, the data access library 413, and the data access PG setting information 414 to the data management device 104.

The analysis process batch execution PG 523 includes descriptions (codes) related to activation of templates developed to the devices which are the deployment destination. When the data analysis process assistance device 106 executes the analysis process batch execution PG 523, for example, the templates deployed to the deployment destination devices are activated in the order specified in the analysis process setting information 512. Note that, in the present embodiment, the execution information generation unit generates the analysis process batch execution PG 523, but the analysis process batch execution PG 523 may be generated using other software such as OSS or commercial software.

Figure 12:
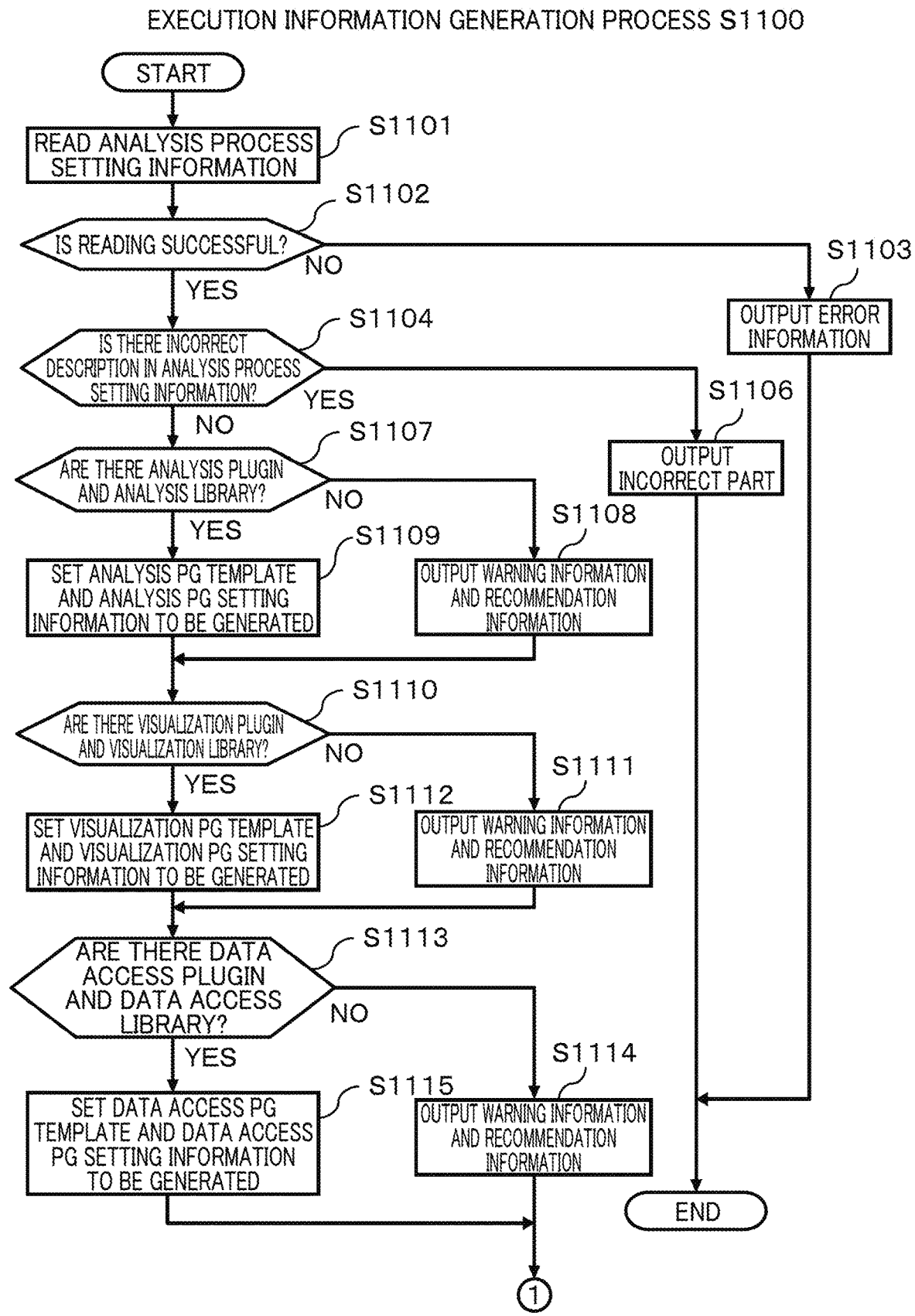
FIG. 12 is a flowchart illustrating the execution information generation process.
Figure 13:
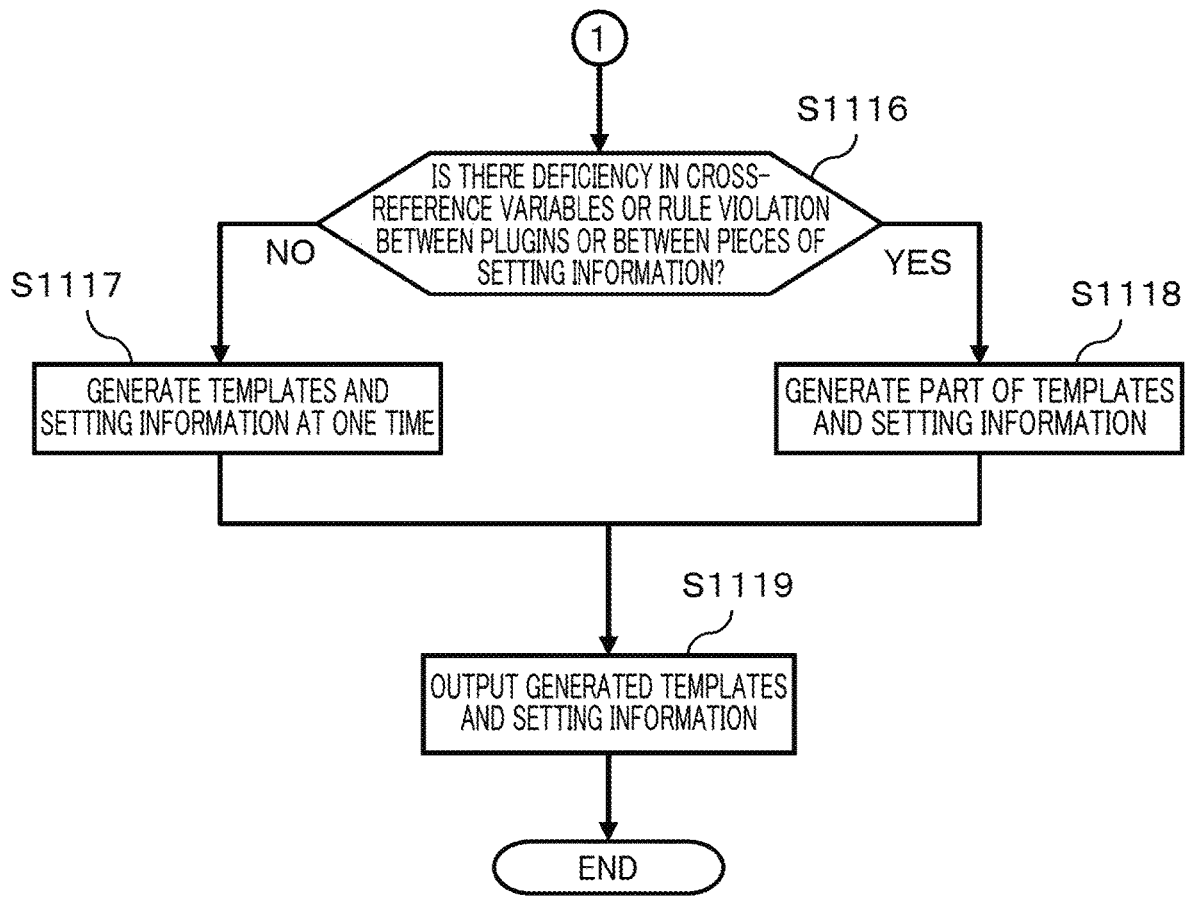
FIG. 13 is a flowchart illustrating the execution information generation process.

FIGS. 12 and 13 are flowcharts illustrating the execution information generation process S1100. Hereinafter, the execution information generation process S1100 will be described with reference to FIGS. 12 and 13.

As illustrated in FIG. 12, the execution information generation unit first reads the analysis process setting information 512 (S1101). If the analysis process setting information 512 is successfully read (S1102: YES), the processing proceeds to S1104. If the analysis process setting information 512 fails to be read (S1102: NO), the processing proceeds to S1103. In S1103, the execution information generation unit outputs error information indicating that the analysis process setting information 512 fails to be read, and ends the program.

Subsequently, the execution information generation unit checks whether or not an incorrect description is included in the read analysis process setting information 512 (incorrect value check) (S1104). If no incorrect description is included (S1104: NO), the processing proceeds to S1107. If an incorrect description is included (S1104: YES), the processing proceeds to S1106, where information indicating the location of the incorrect description, information on a handling method, and the like are output, and then the program ends.

In S1107, the execution information generation unit determines whether or not the analysis plugin specified in the analysis process setting information 512 is included in the analysis plugin set 513 and the analysis library specified in the basic information 702 of the analysis plugin is included in the analysis library set 516. If the analysis plugin specified in the analysis process setting information 512 is included in the analysis plugin set 513 and the analysis library specified in the basic information 702 of the analysis plugin is included in the analysis library set 516 (S1107: YES), then the processing proceeds to S1109. If the analysis plugin specified in the analysis process setting information 512 is not included in the analysis plugin set 513 or the analysis library specified in the basic information 702 of the analysis plugin is not included in the analysis library set 516 (S1107: NO), then the processing proceeds to S1108. In step S1108, the execution information generation unit outputs a warning that the condition for generating the analysis PG template 212 is not satisfied or recommendation information such as a handling method for satisfying the above condition. Thereafter, the processing proceeds to S1110.

In S1109, the execution information generation unit stores therein information indicating that the analysis PG template 212 and the analysis PG setting information 214 are to be generated (or information indicating that they are able to be generated). Thereafter, the processing proceeds to S1110.

In S1110, the execution information generation unit determines whether or not the visualization plugin specified in the analysis process setting information 512 is included in the visualization plugin set 514 and the visualization library specified in the basic information 702 of the visualization plugin is included in the visualization library set 517.

If the visualization plugin specified in the analysis process setting information 512 is included in the visualization plugin set 514 and the visualization library specified in the basic information 702 of the visualization plugin is included in the visualization library set 517 (S1110: YES), then the processing proceeds to S1112. If the visualization plugin specified in the analysis process setting information 512 is not included in the visualization plugin set 514 or the visualization library specified in the basic information 702 of the visualization plugin is not included in the visualization library set 517 (S1110: NO), then the processing proceeds to S1111. In step S1111, the execution information generation unit outputs a warning that the condition for generating the visualization PG template 312 is not satisfied or recommendation information such as a handling method for satisfying the above condition. Thereafter, the processing proceeds to S1113.

In S1112, the execution information generation unit stores therein information indicating that the visualization PG template 312 and the visualization PG setting information 314 are to be generated (or information indicating that they are able to be generated). Thereafter, the processing proceeds to S1113.

In S1113, the execution information generation unit determines whether or not the data access plugin specified in the analysis process setting information 512 is included in the data access plugin set 515 and the data access library specified in the basic information 702 of the data access plugin is included in the data access library set 518. If the data access plugin specified in the analysis process setting information 512 is included in the data access plugin set 515 and the data access library specified in the basic information 702 of the data access plugin is included in the data access library set 518 (S1113: YES), then the processing proceeds to S1115. If the data access plugin specified in the analysis process setting information 512 is not included in the data access plugin set 515 or the data access library specified in the basic information 702 of the data access plugin is not included in the data access library set 518 (S1113: NO), then the processing proceeds to S1114. In step S1114, the execution information generation unit outputs a warning that the condition for generating the data access PG template 412 is not satisfied or recommendation information such as a handling method for satisfying the above condition. Thereafter, the processing proceeds to S1116.

In S1115, the execution information generation unit stores therein information indicating that the data access PG template 412 and the data access PG setting information 414 are to be generated (or information indicating that they are able to be generated). Thereafter, the processing proceeds to S1116 of FIG. 13.

In S1116 of FIG. 13, the execution information generation unit determines whether or not there is a deficiency in cross-reference variables or a rule violation between the plugins or between pieces of the setting information. If the execution information generation unit determines that there is no deficiency or rule violation (S1116: NO), the processing proceeds to S1117. If it is determined that there is any deficiency or rule violation (S1116: YES), the processing proceeds to S1118.

In S1117, the execution information generation unit generates the templates and setting information to be generated in S1109, S1112, and S1115 of FIG. 12 at one time. Thereafter, the processing proceeds to S1119.

In S1118, the execution information generation unit generates part or some of the templates and setting information that are able to be generated among the templates and setting information to be generated in S1109, S1112, and S1115 of FIG. 12. Thereafter, the processing proceeds to S1119.

In S1119, the execution information generation unit outputs the templates and setting information generated in S1117 or S1118. The execution information generation process S1100 ends here.

As described above, according to the data analysis process assistance device 106 according to the present embodiment, it is possible to assist the design and development of the data analysis process to reduce the burden on the user such as a data analyst involved in the data analysis process.

For example, conventionally, data analysts have consumed a lot of efforts and time to study algorithms of data analysis for creation of values, establish programs of extracting necessary data from data lake, introduce libraries and setting information, and survey visualization tools for achieving the desired visualization. However, the data analysis process assistance device 106 as used makes it possible to reduce the burden on the data analysts in such work.

Further, the data access process, the data analysis process, and the analysis result visualization process are closely related to each other. Accordingly, for example, when software or service for the analysis result visualization process is selected, storage locations of analysis result data of the data analysis process are limited. On the other hand, when the data analysis process is selected first, it is necessary to select a source of data to be acquired, the content of processing the data, a number of sampling data to be acquired, or the like in the data access process depending on the specifications required by the data analysis process. However, the data analysis process assistance device 106 as used makes it possible to reduce the burden on the data analysts in the work of ensuring the consistency in consideration of such a mutual relationship between the processes.

In addition, when the analysis content or the format of the analysis target data is changed, it is necessary to review the design of the entire analysis process in order to ensure the consistency between the above processes to successfully execute the data analysis process. However, the data analysis process assistance device 106 as used makes it possible to reduce the burden on the data analysts in such work, and accordingly the data analysts are allowed to concentrate on major work such as examination for algorithms of the data analysis process and evaluation of the analysis results.

Incidentally, the execution information generation process S1100 described above may be executed interactively with the user.

Figure 14:
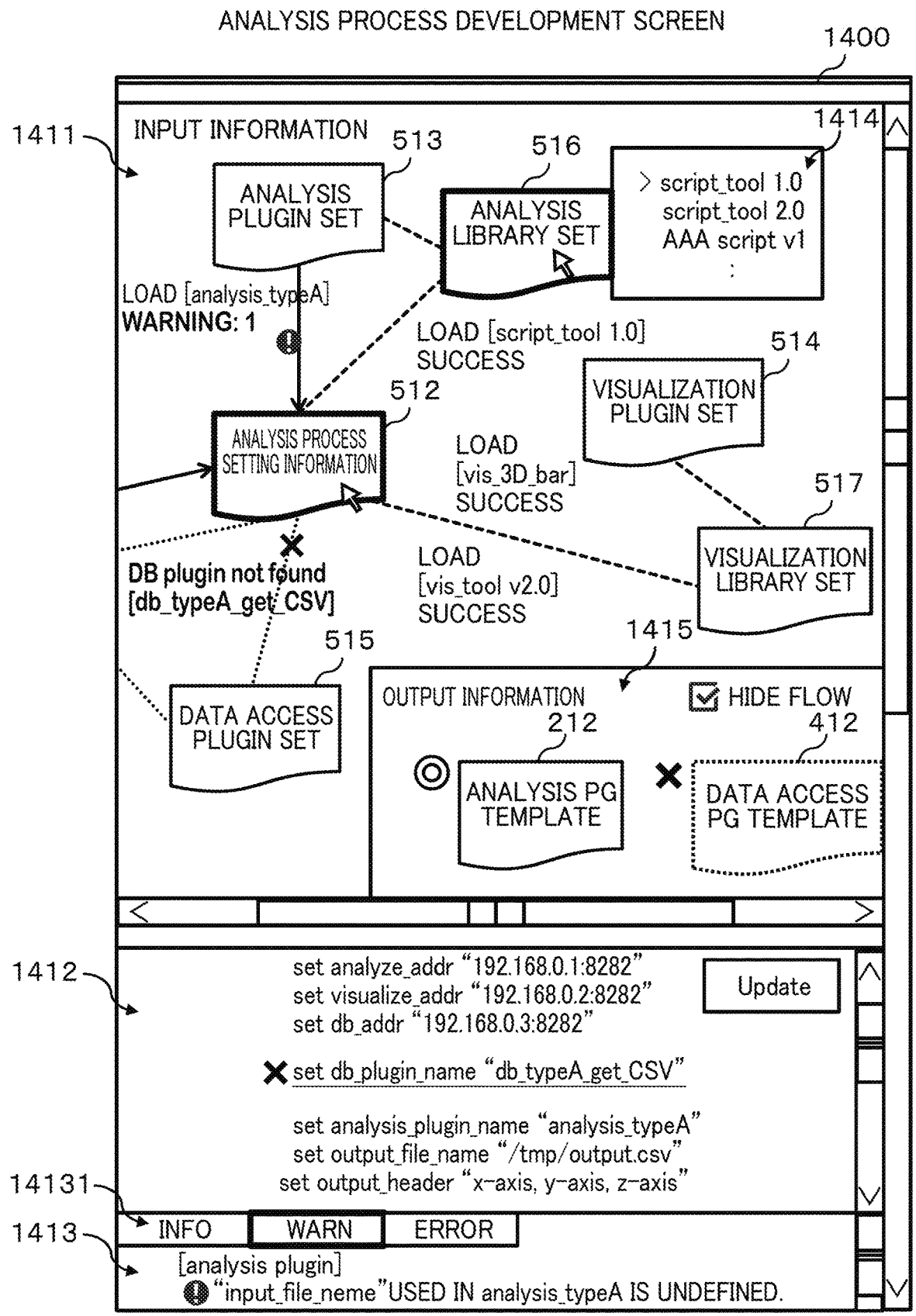
FIG. 14 is an example of an analysis process development screen.

FIG. 14 illustrates an example of a screen (hereinafter referred to as analysis process development screen 1400) presented by the execution information generation unit to the user via the input/output device 503 when the execution information generation process S1100 is executed interactively with the user such as a data analyst. Note that the user may proceed the execution information generation process S1100 in an interactive manner via a device (such as the user device 107) other than the data analysis process assistance device 106.

As illustrated in FIG. 14, the analysis process development screen 1400 has an input information display field 1411, an input information content display field 1412, a warning information display field 1413, a breakdown display field 1414, and an output information display field 1415. The user can work efficiently using the display fields arranged in this way.

The input information display field 1411 is for input information (the analysis plugin set 513, the visualization plugin set 514, the data access plugin set 515, the analysis library set 516, the visualization library set 517, and the data access library set 518) of the execution information generation process S1100, where a reference relationship between the plugins and the libraries, their read statuses, error information when reading such information, an incorrect part, warning information, recommendation information, and the like are displayed using the descriptions of the analysis process setting information 512 as a base.

In this example, with regard to the relationship between the analysis process setting information 512 and the analysis plugin set 513, one warning (WARNING) is displayed that occurs when the analysis plugin, described in the analysis process setting information 512 in the analysis plugin set 513, whose plugin name is "analysis_typeA" is read. Further, an error is displayed that indicates that the data access plugin corresponding to the data access plugin whose plugin name is "db_typeA_get_CSV" is not found between the analysis process setting information 512 and the data access plugin set 515. Based on the content displayed in the input information display field 1411, the user can easily confirm the mutual relationship and consistency between various types of input information, which allows the user to efficiently edit and correct the input information.

In FIG. 14, when one piece of the input information displayed in the input information display field 1411 is selected by the user through an operation such as clicking, the content of the selected piece of input information is displayed in the input information content display field 1412. Note that if there is error information, an incorrect part, warning information, and the like related to the currently selected input information, the relevant location of the content of the input information displayed in the input information display field 1411 is highlighted (for example, underlined, etc.). The user can edit the content of the currently selected input information by directly editing the content of the input information content display field 1412. Further, with respect to the edited content, the user can check the presence or absence of error information, an incorrect part, warning information, and the like, the presence or absence of consistency, and the like by selecting, for example, an update button (not illustrated). Thus, the user can proceed the execution information generation process S1100 efficiently in an interactive manner via the analysis process development screen 1400.

In the warning information display field 1413, details such as error information, an incorrect part, and warning information related to the input information currently selected are displayed. By selecting any one of tabs 14131 ("INFO", "WARN", "ERROR") in FIG. 14, the type of information to be displayed in the warning information display field 1413 can be switched.

When the user performs an operation such as placing a cursor over a piece of input information displayed in the input information display field 1411, the breakdown display field 1414 is displayed in a form such as pop-up. In this example, when the user places the cursor over the analysis library set 516, the breakdown display field 1414 in which analysis libraries included in the analysis library set 516 are listed is displayed in a pop-up form. The example of the breakdown display field 1414 also indicates that the analysis library "script_tool 1.0" referred to from the analysis process setting information 512 is currently selected. In this way, the user can easily check the contents of the libraries using the breakdown display field 1414, which allows the user to work efficiently.

In the output information display field 1415, templates and setting information that are able to be generated by the execution information generation process S1100 described above are displayed. By confirming the display content of the output information display field 1415, the user can easily confirm the progress of the work, and also easily identify the input information that needs to be corrected.

Incidentally, the present invention is not limited to the embodiments described above, and it goes without saying that various modifications are possible without departing from the scope of the invention. For example, the above-described embodiments have been described in detail for the sake of easy understanding of the present invention, but is not necessarily limited to the one having all the configurations described. Further, part of the configuration of the embodiments described may be deleted, replaced with other configuration, or include an additional configuration.

Further, each of the above-described configurations, functional units, process units, processing means, and the like may be provided as hardware by designing part or all of them, for example, with an integrated circuit. Further, each of the above-described configurations, functions, and the like may be provided as software by the processor interpreting and executing programs that define the respective functions. Information such as programs, tables, and files for achieving the respective functions can be stored in a recording device such as a memory, a hard disk, and an SSD, or a recording medium such as an IC card, an SD card, and a DVD.

Further, in each of the above drawings, control lines and information lines indicate what is considered necessary for explanation, and not all the control lines and information lines upon implementation are necessarily illustrated. For example, it may be considered that almost all the configurations are actually connected to each other.

Moreover, the arrangement form of the various functional units, various process units, and various databases of each device described above is merely an example. The arrangement form of the various function units, the various process units, and the various databases may be changed to an optimum arrangement form from the viewpoints of hardware and software performance, processing efficiency, communication efficiency, and the like of the information processing system 1.

Further, the database configuration (schema, etc.) described above may be flexibly changed from the viewpoints of efficient use of resources, improvement of processing efficiency, improvement of access efficiency, improvement of retrieval efficiency, and the like.

REFERENCE SIGNS LIST

1 Information processing system,
5 Communication network,
102 Data analysis device,
103 Analysis result visualization device,
104 Data management device,
106 Data analysis process assistance device,
211 Analysis PG (analysis process unit),
212 Analysis PG template,
213 Analysis library,
214 Analysis PG setting information,
311 Visualization PG,
312 Visualization PG template,
313 Visualization library,
314 Visualization PG setting information,
411 Data access PG,
412 Data access PG template,
413 Data access library,
414 Data access PG setting information,
415 Database,
511 Execution information generation PG (execution information generation unit),
512 Analysis process setting information,
513 Analysis plugin set,
514 Visualization plugin set,
515 Data access plugin set,
516 Analysis library set,
517 Visualization library set,
518 Data access library set,
521 Deployment PG,
522 Deployment setting information,
523 Analysis process batch execution PG

The invention claimed is:

1. A data analysis process assistance device for assisting a data analysis performed by executing each of a data access process, a data analysis process, and an analysis result visualization process, the data analysis process assistance device comprising:
   a processor and a storage device;
   a storage unit configured to store analysis process setting information including setting information for variables commonly used between the respective processes, and plugins corresponding to the respective processes, each of the plugins including basic information that is information on contents of the respective processes, a program code used as a base to generate a template for a program for achieving each of the processes, the variables of the analysis process setting information, and a description related to a variable cross-referenced between the respective processes; and
   an execution information generation unit configured to generate the template while ensuring a relationship or consistency between the analysis process setting information and the plugins corresponding to the respective processes.

2. The data analysis process assistance device according to claim 1, comprising
   an input/output device,
   wherein the execution information generation unit ensures the relationship or consistency between the analysis process setting information and the plugins corresponding to the respective processes in an interactive manner performed via the input/output device while presenting information related to an incorrect part or inconsistency between the respective processes to a user.

3. The data analysis process assistance device according to claim 1, wherein
   the analysis process setting information includes information for specifying the plugin and setting information for variables used in the plugin specified by the information.

4. The data analysis process assistance device according to claim 1, wherein
the plugin includes at least one description of a description related to a library referred to by the template, a description related to a rule to be satisfied between the analysis process setting information and the plugins corresponding to the respective processes, a description related to optional information when the template is generated, and a description related to specifications of input/output arguments of the template.

5. The data analysis process assistance device according to claim 4, wherein
the program code includes a description that refers to at least one of a variable described in the analysis process setting information, a variable set in each plugin specified in the analysis process setting information, and a variable acquired from the rule described in the plugin.

6. The data analysis process assistance device according to claim 2, wherein
the execution information generation unit ensures consistency between the analysis process setting information and the plugins corresponding to the respective processes in the interactive manner performed while presenting consistency between the plugin and a program library referred to by the plugin to a user.

7. The data analysis process assistance device according to claim 1, wherein
the plugins corresponding to the respective processes are described according to a common notation.

8. The data analysis process assistance device according to claim 1, wherein
the analysis process setting information includes information indicating a location of a distribution destination of the template, and
the execution information generation unit generates a code for achieving a process of distributing the template to the distribution destination.

9. The data analysis process assistance device according to claim 8, wherein
the execution information generation unit generates a code for achieving a process of causing the distribution destination to execute the templates distributed to the distribution destination in order.

10. A data analysis process assistance method for assisting a data analysis performed by executing each of a data access process, a data analysis process, and an analysis result visualization process, the method by an information processing device comprising the steps of:
storing analysis process setting information including setting information for variables commonly used between the respective processes, and plugins corresponding to the respective processes, each of the plugins including basic information that is information on contents of the respective processes, a program code used as a base to generate a template for a program for achieving each of the processes, the variables of the analysis process setting information, and a description related to a variable cross-referenced between the respective processes; and
generating the template while ensuring a relationship or consistency between the analysis process setting information and the plugins corresponding to the respective processes.

11. The data analysis process assistance method according to claim 10, further comprising
a step of, by the information processing device, ensuring the relationship or consistency between the analysis process setting information and the plugins corresponding to the respective processes in an interactive manner performed via an input/output device while presenting information related to an incorrect part or inconsistency between the respective processes to a user.

12. The data analysis process assistance method according to claim 10, wherein
the analysis process setting information includes information for specifying the plugin and setting information for variables used in the plugin specified by the information.

13. The data analysis process assistance method according to claim 10, wherein
the plugin includes at least one description of a description related to a library referred to by the template, a description related to a rule to be satisfied between the analysis process setting information and the plugins corresponding to the respective processes, a description related to optional information when the template is generated, and a description related to specifications of input/output arguments of the template.

14. The data analysis process assistance method according to claim 13, wherein
the program code includes a description that refers to at least one of a variable described in the analysis process setting information, a variable set in each plugin specified in the analysis process setting information, and a variable acquired from the rule described in the plugin.

15. The data analysis process assistance method according to claim 11, further comprising
a step of, by the information processing device, ensuring consistency between the analysis process setting information and the plugins corresponding to the respective processes in the interactive manner performed while presenting consistency between the plugin and a program library referred to by the plugin to a user.

16. The data analysis process assistance method according to claim 10, wherein
the plugins corresponding to the respective processes are described according to a common notation.

17. The data analysis process assistance method according to claim 10, wherein
the analysis process setting information includes information indicating a location of a distribution destination of the template, and
the method further comprises a step of, by the information processing device, generating a code for achieving a process of distributing the template to the distribution destination.

18. The data analysis process assistance method according to claim 17, the method further comprising
a step of, by the analysis process setting information, generating a code for achieving a process of causing the distribution destination to execute the templates distributed to the distribution destination in order.

* * * * *